United States Patent
Chou et al.

(10) Patent No.: US 8,308,317 B2
(45) Date of Patent: Nov. 13, 2012

(54) SURFACE LIGHT SOURCE STRUCTURE OF BACKLIGHT MODULE IN A FLAT PANEL DISPLAY

(75) Inventors: Wei-Jen Chou, Hsinchu (TW);
Chien-Chung Hsiao, Hsinchu (TW);
Bor-Jyh Pan, Hsinchu (TW);
Chiao-Chih Yang, Hsinchu (TW)

(73) Assignee: Young Lighting Technology Inc., Hsinchu (TW)

( * ) Notice: Subject to any disclaimer, the term of this patent is extended or adjusted under 35 U.S.C. 154(b) by 858 days.

(21) Appl. No.: 12/071,958

(22) Filed: Feb. 28, 2008

(65) Prior Publication Data
US 2009/0091947 A1    Apr. 9, 2009

(30) Foreign Application Priority Data
Oct. 4, 2007   (TW) .................... 96137210 A

(51) Int. Cl.
| G09F 13/04 | (2006.01) |
| G09F 13/08 | (2006.01) |
| F21V 9/00 | (2006.01) |
| H05B 37/00 | (2006.01) |
| H05B 39/00 | (2006.01) |
| H05B 41/00 | (2006.01) |

(52) U.S. Cl. ........ 362/231; 362/97.3; 315/191; 315/192
(58) Field of Classification Search .................. 362/97.3, 362/231; 315/191, 192
See application file for complete search history.

(56) References Cited

U.S. PATENT DOCUMENTS

| 5,008,788 | A | 4/1991 | Palinkas |
| 5,187,377 | A | 2/1993 | Katoh |
| 6,288,497 | B1* | 9/2001 | Chang et al. ............... 315/185 R |
| 6,461,019 | B1* | 10/2002 | Allen ......................... 362/249.06 |
| 6,521,879 | B1* | 2/2003 | Rand et al. ................... 250/205 |
| 6,641,294 | B2* | 11/2003 | Lefebvre ...................... 362/544 |
| 6,932,498 | B2* | 8/2005 | Miyazaki ...................... 362/545 |
| 7,102,172 | B2* | 9/2006 | Lynch et al. .................... 257/79 |
| 8,049,709 | B2* | 11/2011 | Roberts et al. ................ 345/102 |
| 2005/0077838 | A1 | 4/2005 | Blumel |
| 2005/0253151 | A1* | 11/2005 | Sakai et al. ..................... 257/79 |
| 2007/0013647 | A1 | 1/2007 | Lee et al. |
| 2007/0115671 | A1* | 5/2007 | Roberts et al. ................ 362/367 |
| 2007/0217210 | A1* | 9/2007 | Jeong et al. ................... 362/428 |

FOREIGN PATENT DOCUMENTS
TW    200300545    10/2007

OTHER PUBLICATIONS

Office Action dated Mar. 30, 2012 issued in corresponding Taiwan application No. 096137210.

* cited by examiner

*Primary Examiner* — David J Makiya
(74) *Attorney, Agent, or Firm* — Bacon & Thomas, PLLC

(57) ABSTRACT

A surface light source structure having a circuit board, a first light emitting diode (LED) array, and a second LED array is provided. The first and second LED arrays are assembled on the circuit board. Each LED rows of the two LED arrays has a plurality of LED units connected in series. The LED rows of the first LED array are connected in parallel. The LED rows of the second LED array are connected in parallel. The LED rows of the second LED array are intersected between the LED rows of the first LED array. Positive-to-negative directions of the LED units of the first and second LED array are arranged in opposite directions.

20 Claims, 11 Drawing Sheets

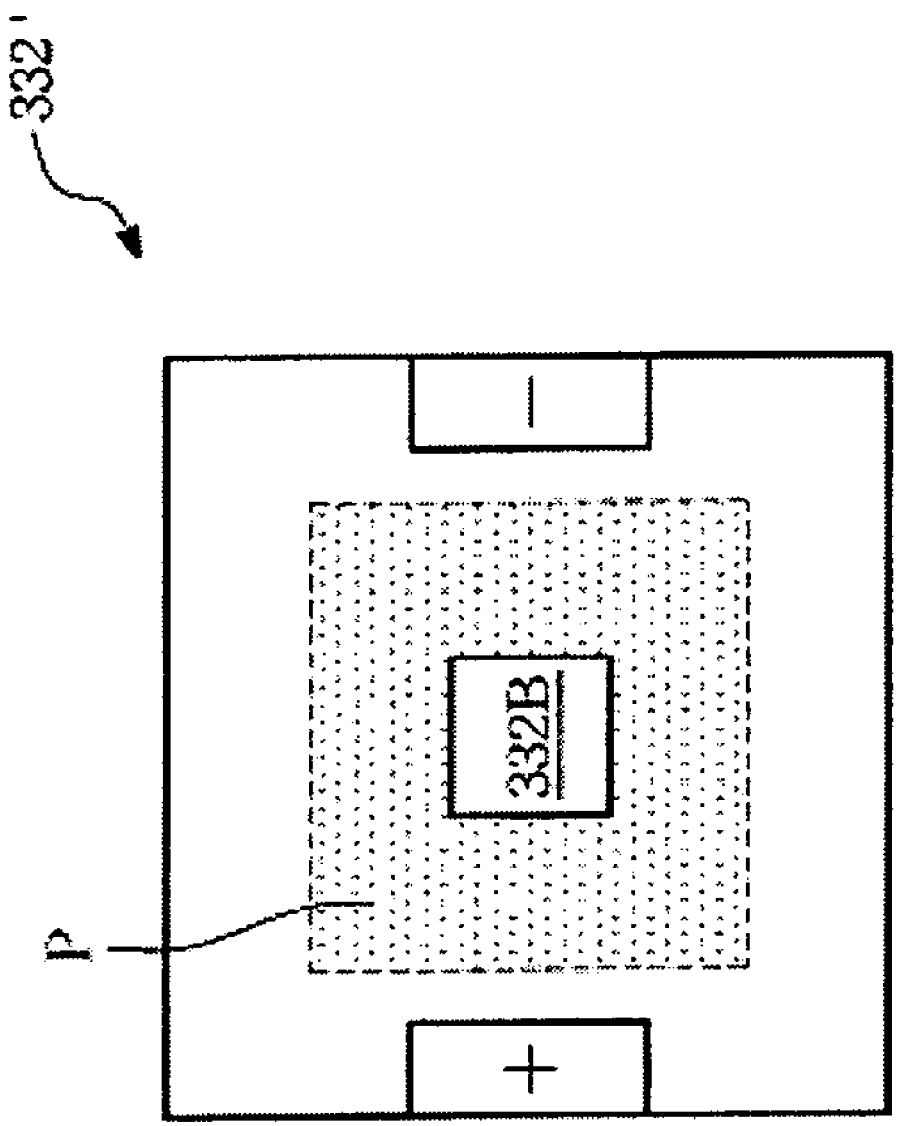

SURFACE LIGHT SOURCE STRUCTURE OF BACKLIGHT MODULE IN A FLAT PANEL DISPLAY

BACKGROUND OF THE INVENTION (1) Field of the Invention

This invention relates to a surface light source structure, and more particularly relates to a surface light source structure applied in a backlight module of a flat panel display.

(2) Description of the Prior Art

In present, light emitting diode (LED) with the advantages of small size and low power consumption has replaced traditional cold cathode fluorescent lamp (CCFL), and has become a mainstream product applied in the backlight module of the flat panel display.

FIGS. 1A and 1B depict two popular embodiments using LED as a light source of the flat panel display. One is to assemble the LEDs 22 beside the edge of the backlight module 20 for projecting light traversing the backlight module 20. The traversing light is transformed into upward light by reflection and refraction and then projected to the display panel 10. The other is to assemble the LEDs 32 under the backlight module 30 for projecting light upward and penetrating the backlight module 30 to the display panel 10.

Generally, the embodiment assembling LEDs 22 beside the edge of the backlight module 20 reduces the number of LEDs 22 and simplifies related circuit design, however, the uniformity of the surface light generate by the backlight module 20 is hard to be controlled. For example, the location near the LEDs 22 usually has greater brightness. Thus, this embodiment is mainly adapted to small-size display. In contrast, although the embodiment assembling LEDs 32 under the backlight module 30 in array has a complicated circuit design, the backlight module 30 is capable to provide uniform surface light illuminating the display panel 10.

FIG. 2A is a schematic view showing a traditional surface light source structure 100 applied in the backlight module. FIG. 2B is a circuit diagram of the surface light source structure 100. As shown, the surface light source structure 100 has a circuit board 120 and a light emitting diode (LED) array 140. The circuit board 120 has a conductive pattern 122 formed thereon. The LED array 140 is assembled on the circuit board 120. The LED units 142 of the LED array 140 are connected to each other through the conductive pattern 122 on the circuit board 120. The LED units 142 of the same row are connected in series. The rear ends of every two neighboring LED rows (right end in the figure) are electrically connected to each other. Meanwhile, the front ends of the two neighboring LED rows are connected to a positive electrode 150 and a negative electrode 160 respectively. That is, the LED units 142 of the two neighboring LED rows are connected in series between the positive electrode 150 and the negative electrode 160 which are located on the same edge of the circuit board 120.

Since the LED array 140 features two neighboring LED rows connected in series, the LED array 140 must have even LED rows, which creates an additional limitation toward the circuit design of the circuit board 120 and the layout of the LED units 142. In addition, the number of LED units 142 connected in series between the positive electrode 150 and the negative electrode 160 is the number of columns of the LED array 140 multiplies two. The increasing of LED units 142 connected in series may badly affect the uniformity of the LED units 142 and make the LED array 140 difficult to control.

FIG. 3A is a schematic view showing another traditional surface light source structure 200 applied in the backlight module. FIG. 3B is a circuit diagram of the surface light source structure 200. As shown, the surface light source structure 200 has a circuit board 220 and an LED array 240. The circuit board 220 has a conductive pattern 222 formed thereon. The LED array 240 is assembled on the circuit board 220. The LED units 242 of the LED array 240 are connected to each other through the conductive pattern 222 on the circuit board 220. The LED units 242 of the same row are connected in series. In addition, every rows of the LED array 240 are connected between a positive electrode 250 and a negative electrode 260 in parallel. The positive electrode 250 and the negative electrode 260 are located on the opposite edges of the circuit board 220.

In contrast to the surface light source structure 100 of FIG. 2A, the number of the LED units 242 connected in series in the surface light source structure 200 is identical to the number of columns of the LED array 240. In addition, the LED array 240 may have a design of using odd LED rows. Nevertheless, the positive-to-negative directions of all the LED units 142 of the LED array 240 are identical, which is the direction from the left side of the circuit board 220 to the right side in the figure. However, if the positive-to-negative directions of all the LED units 242 of the LED array 240 are identical, the uniformity of the resulted white light would be badly influenced by the layout of the LED chips 242G, 242R, 242B on the LED unit 242. For example, the LED unit 242 in the figure has a green, a red, and a blue LED chips 242G, 242R, 242B arranged from the top down in sequence to generate white light. The light of the surface light source structure 200 may be greener near the upper side but bluer near the lower side. In order to solve this problem, referring to FIG. 3C, a typical method is to adapt different LED units 242*a*, 242*b* in the neighboring LED rows 241*a*, 241*b*. For example, the LED units 242*a* of the first LED row 241*a* has a green, a red, and a blue LED chips 242G, 242R, 242B arranged from the top down in sequence, and the LED units 242*b* of the second LED row 241*b* has a blue, a red, and a green LED chips 242B, 242R, 242G arranged from the top down in sequence so as to compensate the light provided by the LED units 242*a*. However, the design using different LED units 242*a*, 242*b* increases fabrication cost.

The arrangement of LED arrays 140, 240 of the above mentioned surface light source structures 100,200 have their drawbacks. Accordingly, a surface light source structure is provided in the present invention, which does not need to use different LED units, reduces the number of LED units connected in series, and also enhances the uniformity of light.

SUMMARY OF THE INVENTION

It is a main object of the present invention to provide a surface light source structure, which uses a single type of LED units but is capable to solve the problems of poor light uniformity and the difficulty to control the LED array.

For achieving one, some or all of the above mentioned object, a surface light source structure is provided in an embodiment of the present invention. The surface light source structure has a circuit board, a first light emitting diode (LED) array, and a second LED array. The first LED array is assembled on the circuit board and has a plurality of LED rows. Each of the LED rows has a plurality of LED units connected in series. The LED rows of the first LED array are connected between a first positive electrode and a first negative electrode in parallel. The second LED array is assembled on the circuit board and has a plurality of LED rows. Each of the LED rows has a plurality of LED units connected in series. The LED rows of the second LED array are connected between a second positive electrode and a second negative electrode in parallel. The LED rows of the second LED array are intersected between the LED rows of the first LED array, and positive-to-negative directions of the LED units of the first LED array and those of the second LED array are arranged in opposite directions.

In an embodiment of the present invention, a backlight module using the above mentioned surface light source structure is also provided. In addition to the above mentioned surface light source structure, the backlight module further has at least an optical film assembled on the circuit board to uniform light provided by the LED units of the first LED array and that of the second LED array.

In an embodiment of the present invention, the LED units of the first LED array and that of the second LED array have the identical structure. The LED unit is an LED package with at least a red, at least a blue, and at least a green LED chips.

In an embodiment of the present invention, each of the LED units of the first LED array and the second LED array has at least a red LED package, at least a blue LED package, and at least a green LED package to generate white light.

In an embodiment of the present invention, the LED rows of the first LED array and those of the second LED array are parallel to a short edge of the circuit board.

In an embodiment of the present invention, further has a reflecting layer covering the circuit board to reflect the light provided by the LED units of the first LED array and that of the second LED array.

In an embodiment of the present invention, the circuit board has a through hole formed thereon, and a detecting unit is assembled in the through hole for detecting light of the surface light source structure.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The present invention will now be specified with reference to its preferred embodiment illustrated in the drawings, in which:

FIG. 4C is a schematic view showing an LED package according to another preferred embodiment in FIG. 4A;

DESCRIPTION OF THE PREFERRED EMBODIMENT

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 4A:
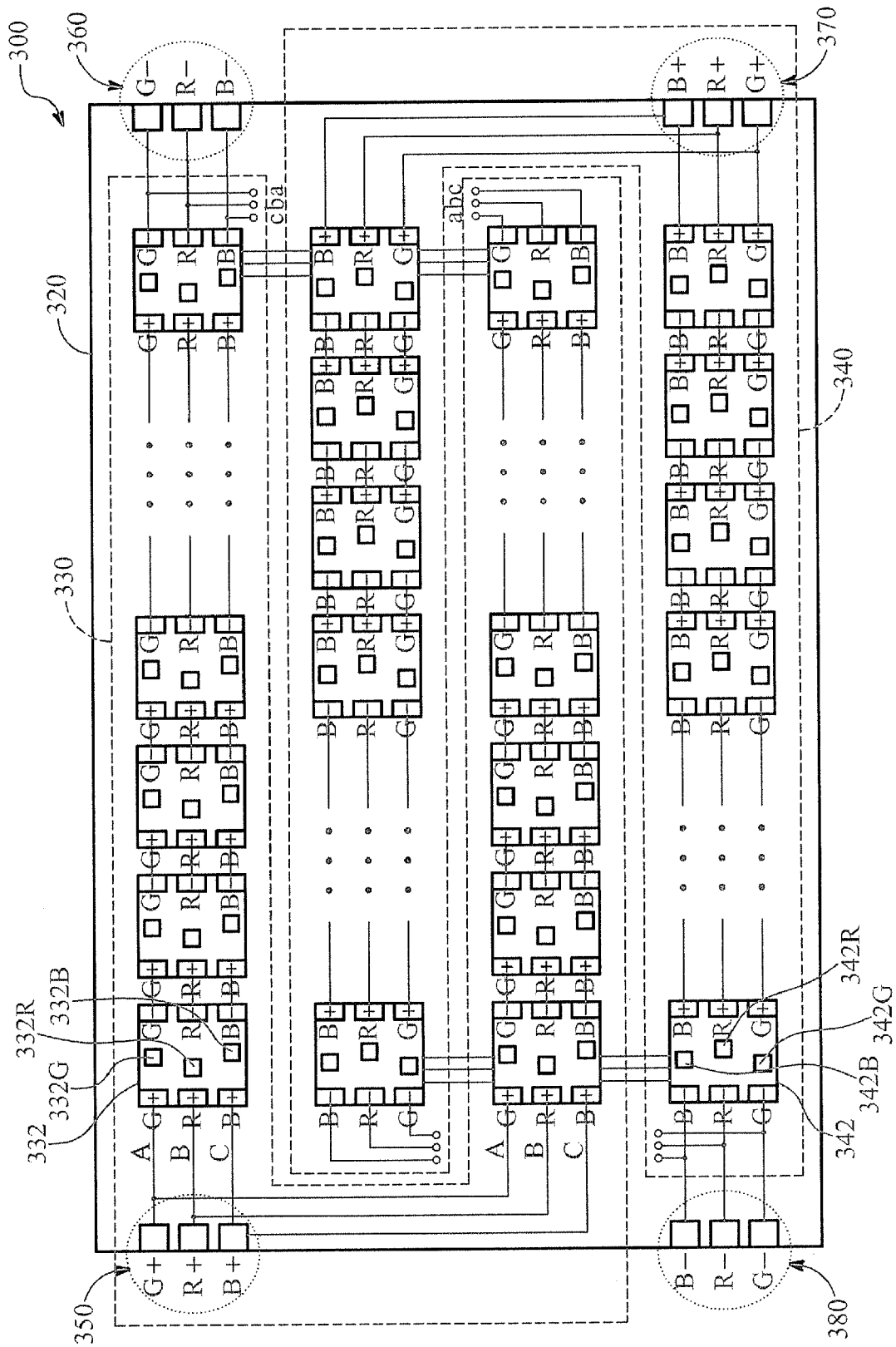
FIG. 4A is a schematic view showing a surface light source structure applied in a backlight module according to an embodiment of the present invention.
Figure 4B:
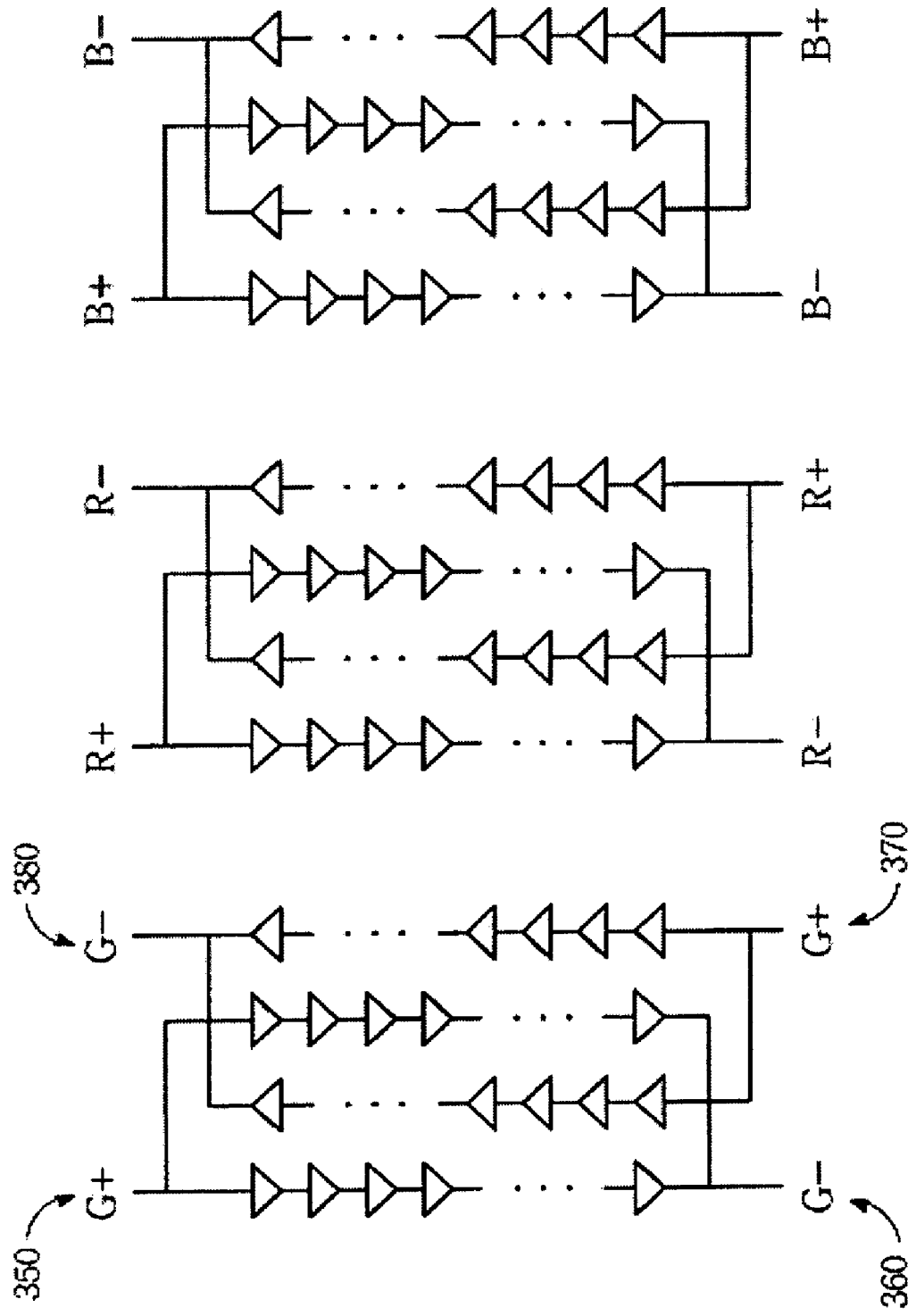
FIG. 4B is a circuit diagram of the surface light source structure of FIG. 4A.

FIG. 4A is schematic view showing a surface light source structure 300 according to a preferred embodiment of the present invention, which may be applied in a backlight module. As shown, the surface light source structure 300 has a circuit board 320, a first light emitting diode (LED) array 330, and a second LED array 340. The first LED array 330 is assembled on the circuit board 320 and has a plurality of LED rows. Each of the LED rows has a plurality of LED units 332 connected in series. The LED rows of the first LED array 330 are connected between a first positive electrode 350 and a first negative electrode 360 in parallel. As illustrated in FIG. 4A, the electrical connections A, B, and C from the first positive electrode 350 correspond to the parallel LED row from the first LED array 330. Additionally, electrical connections a, b, and c from the first negative electrode 360 correspond to the parallel LED row from the first LED array 330. The second LED array 340 is also assembled on the circuit board 320 and has a plurality of LED rows. Each of the LED rows has a plurality of LED units 342 connected in series. The LED rows of the second LED array 340 are connected between a second positive electrode 370 and a second negative electrode 380 in parallel.

The LED units 332 of the first LED array 330 and the LED units 342 of the second LED array 340 have the identical structure. However, a positive-to-negative direction of the LED units 332 of the first LED array 330 assembled on the circuit board 320 and that of the LED units 342 of the second LED array 340 assembled on the circuit board 320 are arranged in opposite directions. That is, the first positive electrode 350 and the second negative electrode 380 are located on an edge of the circuit board 320, and the first negative electrode 360 and the second positive electrode 370 are located on another edge of the circuit board 320. As a preferred embodiment, the first positive electrode 350 is electrically connected to the second positive electrode 370 and the first negative electrode 360 is electrically connected to the second negative electrode 380 to make sure that the potential of the both electrodes connected to the first LED array 330 and that connected to the second LED array 340 are identical.

In the present embodiment, the LED units 332, 342 of the first LED array 330 and the second LED array 340 are LED packages. Each of the LED package has at least a red, at least a blue, and at least a green LED chips 332G, 342G, 332R, 342R, 332B, 342B so as to generate white light. The LED package with a red, a blue, and a greed LED chips is shown as an example in this figure.

The LED package in the present embodiment uses green light, red light, and blue light to generate white light. However, it should not be a limitation toward the present invention. Referring to FIG. 4C, there shows another preferred embodiment of the LED package 332' in the present invention, which has at least a blue LED chip 332B and a packaging structure P mixed with yellow-green fluorescent powders made of yttrium aluminum garnet covering the blue LED chip 332B. By using the character of fluorescent illumination, the packaging structure P is capable of transforming the light provided by the blue LED chip 332B into whit light. In addition, the usage of yellow-green fluorescent powders should not be a limitation to the present invention. A packaging structure P mixed with red and greed fluorescent powders is also capable of generating white light.

It is noted that since the positive-to-negative direction of the LED units 332 of the first LED array 330 and that of the LED units 342 of the second LED array 340 are arranged in opposite directions, the LED units 332 and the LED units 342, which are respectively in two neighboring LED rows on the circuit board 320, respective have a layout of LED chips 332G, 332R, 332B and a layout of LED chips 342G, 342R, 342B that are reverse with each other. For example, the LED unit 332 of the first LED array 330 has a green, a red, and a blue LED chips 332G, 332R, 332B arranged from the top down in sequence, and the LED unit 342 of the second LED array 340 has a blue, a red, and a green LED chips 342B, 342R, 342G arrange from the top down in sequence. Therefore, the light of the LED units 342 of the second LED array 340 may be compensated by the light of the LED units 332 of the first LED array 330 so as to solve the problem of poor light uniformity.

Figure 5:
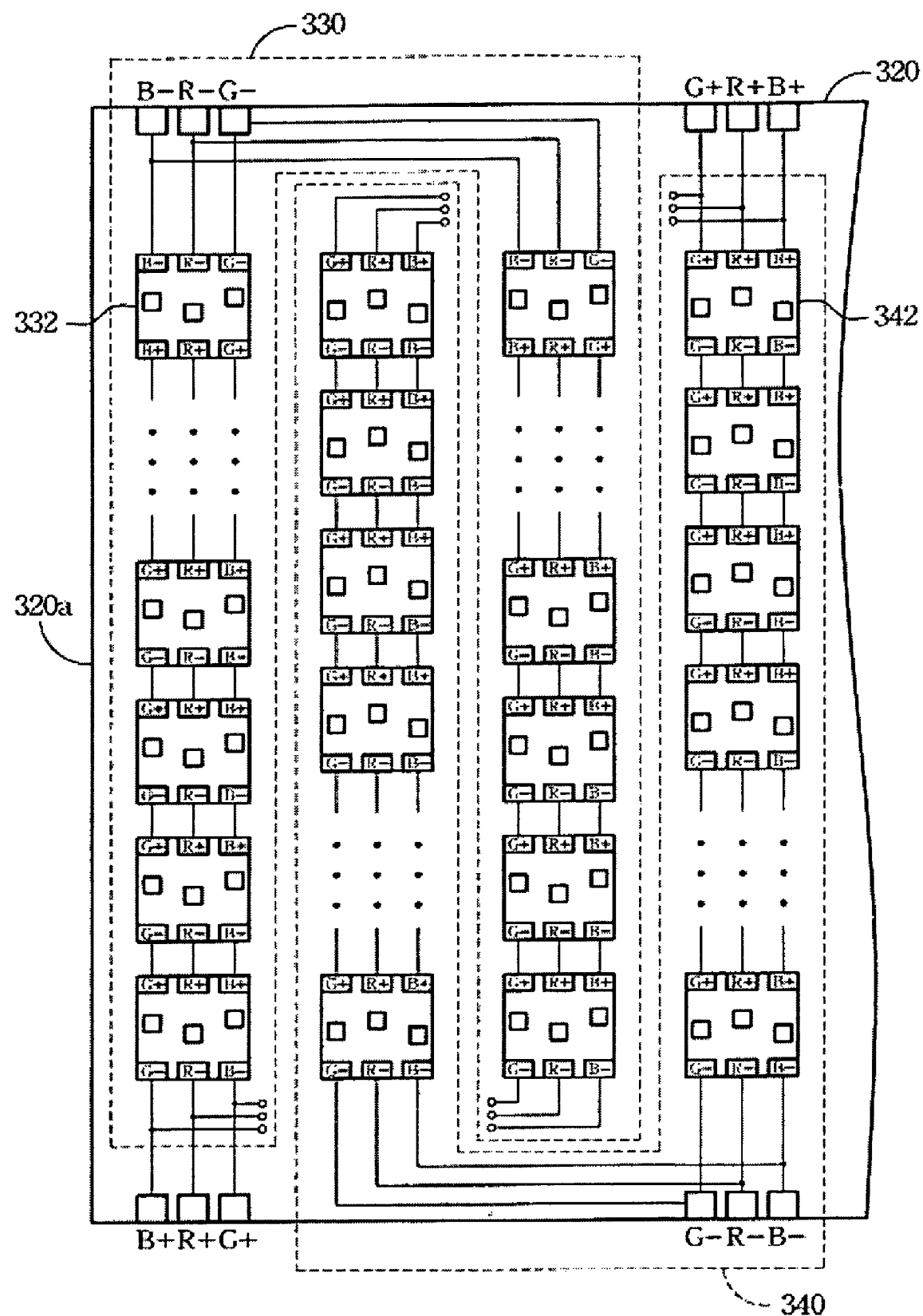
FIG. 5 is a schematic view showing a surface light source structure applied in a backlight module according to another preferred embodiment of the present invention.

In the present embodiment, the LED rows of the first LED array 330 and that of the second LED array 340 are parallel to the long edge of the circuit board 320. However, it should not be a limitation in the present invention. As shown in FIG. 5, the LED rows of the first LED array 330 and that of the second LED array 340 are parallel to the short edge 320a of the circuit board 320 so as to reduce the number of LED units 332, 342 connected in series. Thus, the problems of poor light uniformity and the difficulty to control the LED arrays 330, 340 because of too much LED units 332, 342 connected in series are solved.

Figure 6:
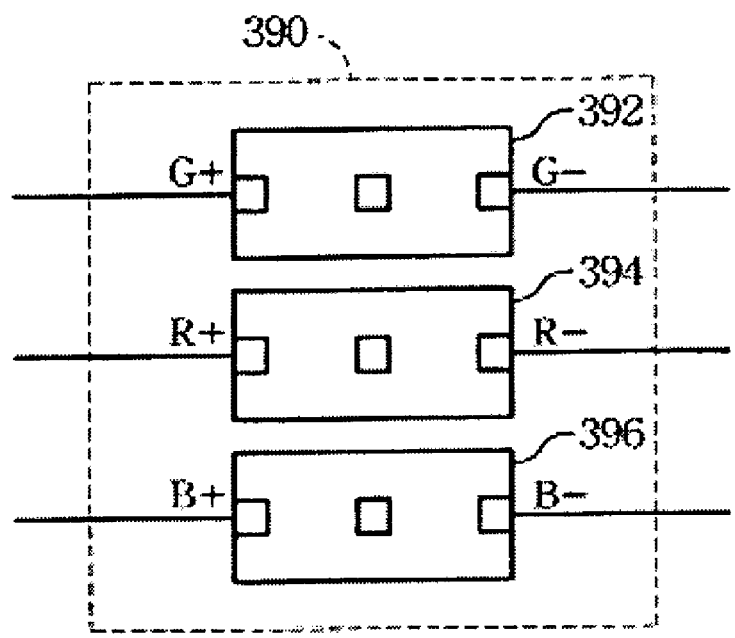
FIG. 6 is a schematic view showing an LED package according to another preferred embodiment of the present invention.

FIG. 6 is a schematic view showing an LED unit according to another embodiment of the present invention. Different from the LED units 332, 342 shown in FIG. 4A, which features an LED package with a green, a red, and a blue LED chips, the LED unit 390 of the present embodiment is composed of at least a green LED package 392, at least a red LED package 394, and at least a blue LED package 396 so as to generate white light. The LED unit 390 composed of a green LED package 392, a red LED package 394, and a blue LED package 396 is shown as an example in the present embodiment.

Figure 7:
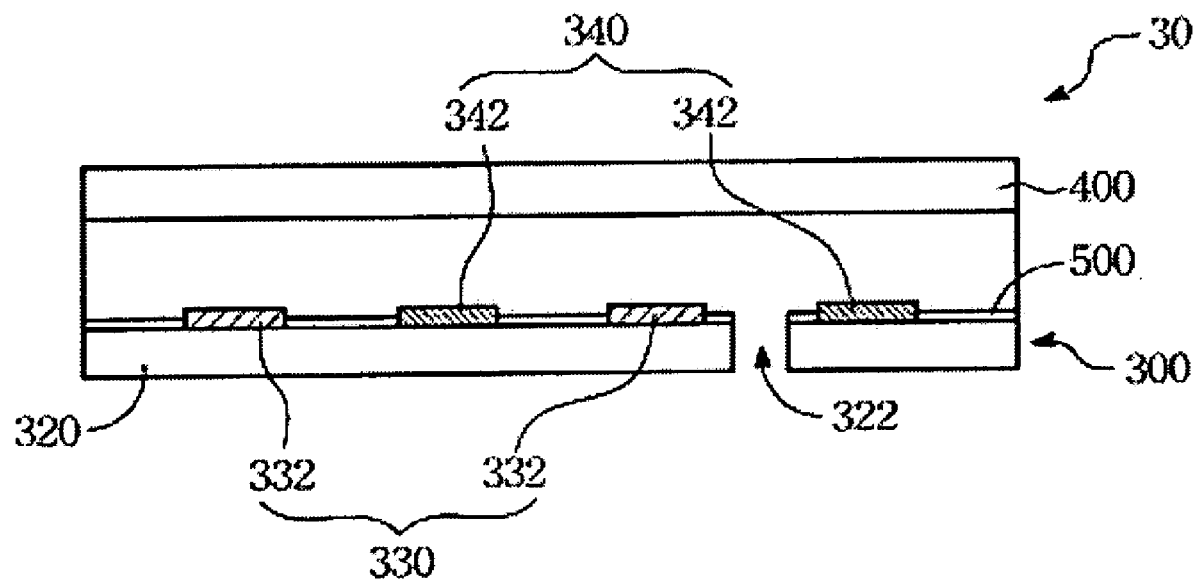
FIG. 7 is a schematic view showing a backlight module according to a preferred embodiment of the present invention.

FIG. 7 is a cross-section view showing a backlight module 30 according to a preferred embodiment of the present invention. As shown, the backlight module 30 has the surface light source structure 300 as shown in FIG. 4A and at least an optical film 400, such as a diffuser. The optical film 400 is assembled on the circuit board 320 to uniform the light of the LED units 332, 342 of the first LED array 330 and the second LED array 340. In order to enhance illumination efficiency of the surface light source structure 300, a reflecting layer 500 is provided to cover the circuit board 320 to reflect light provided by the LED units 332, 342 of the first LED array 330 and the second LED array 340. In addition, in order to feedback control the brightness of the backlight module 30, the circuit board 320 has a through hole 322 formed thereon, and a detecting unit (not shown in this figure) is assembled in the through hole 322 and extended toward the display panel for detecting light generated by the surface light source structure 300.

Figure 1A:
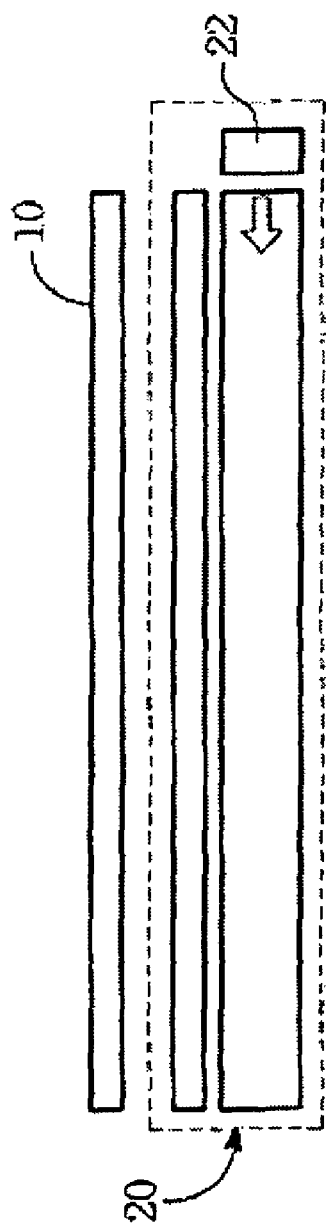
FIGS. 1A and 1B are schematic views showing two embodiments using LEDs as light sources of flat panel displays.
Figure 1B:
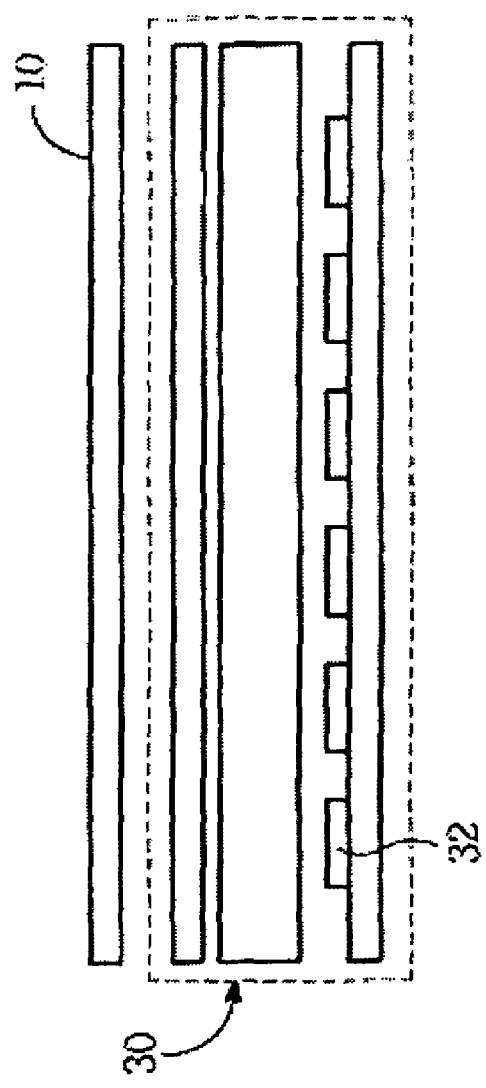
Figure 2A:
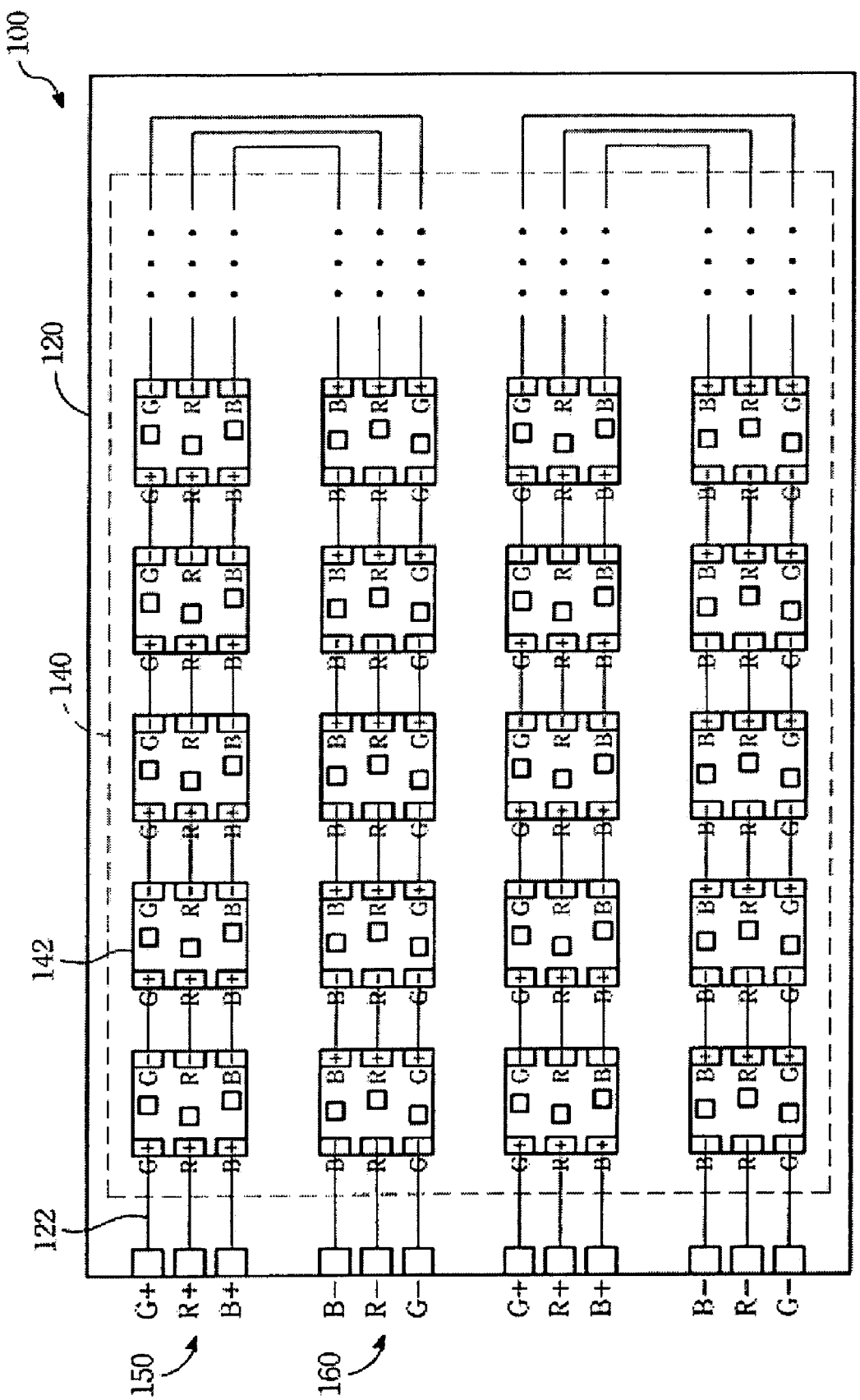
FIG. 2A is a schematic view showing a typical surface light source structure applied in the backlight module.
Figure 2B:
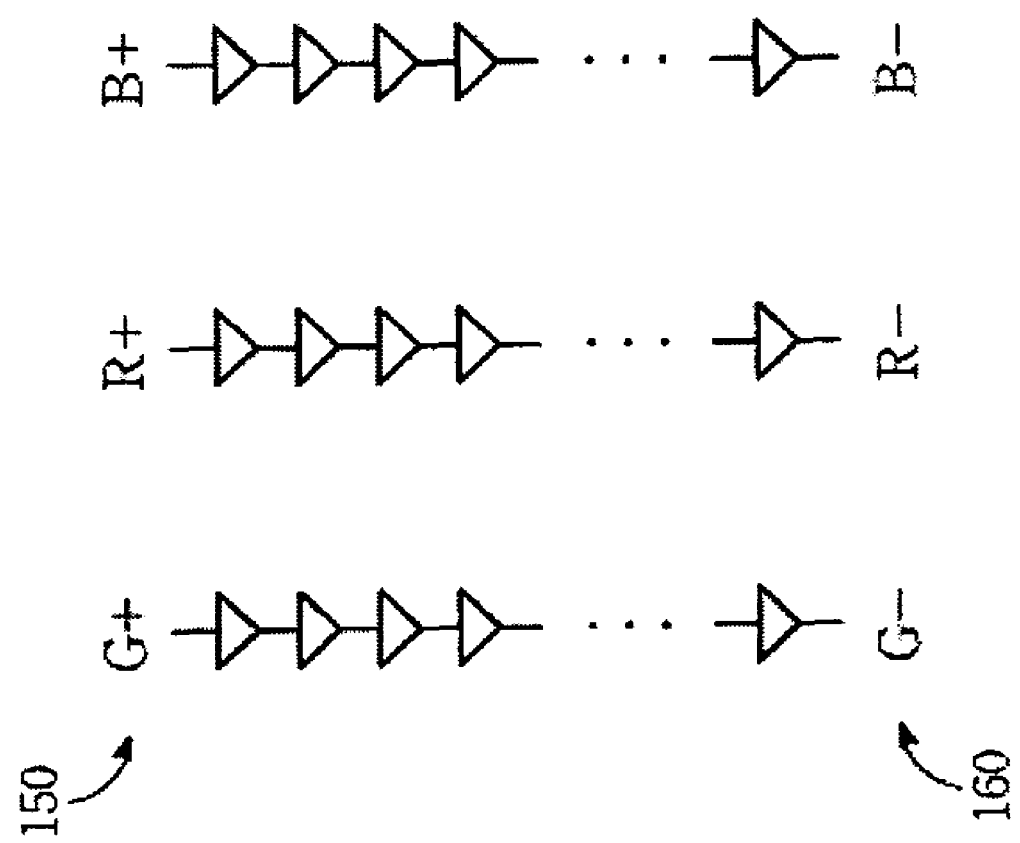
FIG. 2B is a circuit diagram of the surface light source structure of FIG. 2A.

Different from the surface light source structure 100 of FIG. 2A, the first LED array 330 or the second LED array 340 may have a design of odd LED rows, but the two arrays 330, 340 do not have to use identical number of LED rows. Thus, the surface light source structure 300 of the embodiments of the present invention is adapted to a design of odd LED rows. In addition, as shown in FIG. 2A, the number of LED units 142 connected between the positive electrode 150 and the negative electrode 160 in series is the number of columns of the LED array 140 multiplies two. In contrast, in the embodiments of the present invention, the number of LED units 332, 342 of the first LED array 330 and the second LED array 340 connected in series is identical to the number of columns of the LED array composed of the first LED array 330 and the second LED array 340. Thus, the problems of poor light uniformity and the difficulty to control the LED array 330, 340 because of too much LED units 332, 342 connected in series is solved. Referring to FIG. 5 furthermore, the LED units 332, 342 aligned parallel to the short edge 320a of the circuit board 320 are connected in series to form an LED row so as to reduce the number of LED units 332, 342 connected in series.

Figure 3A:
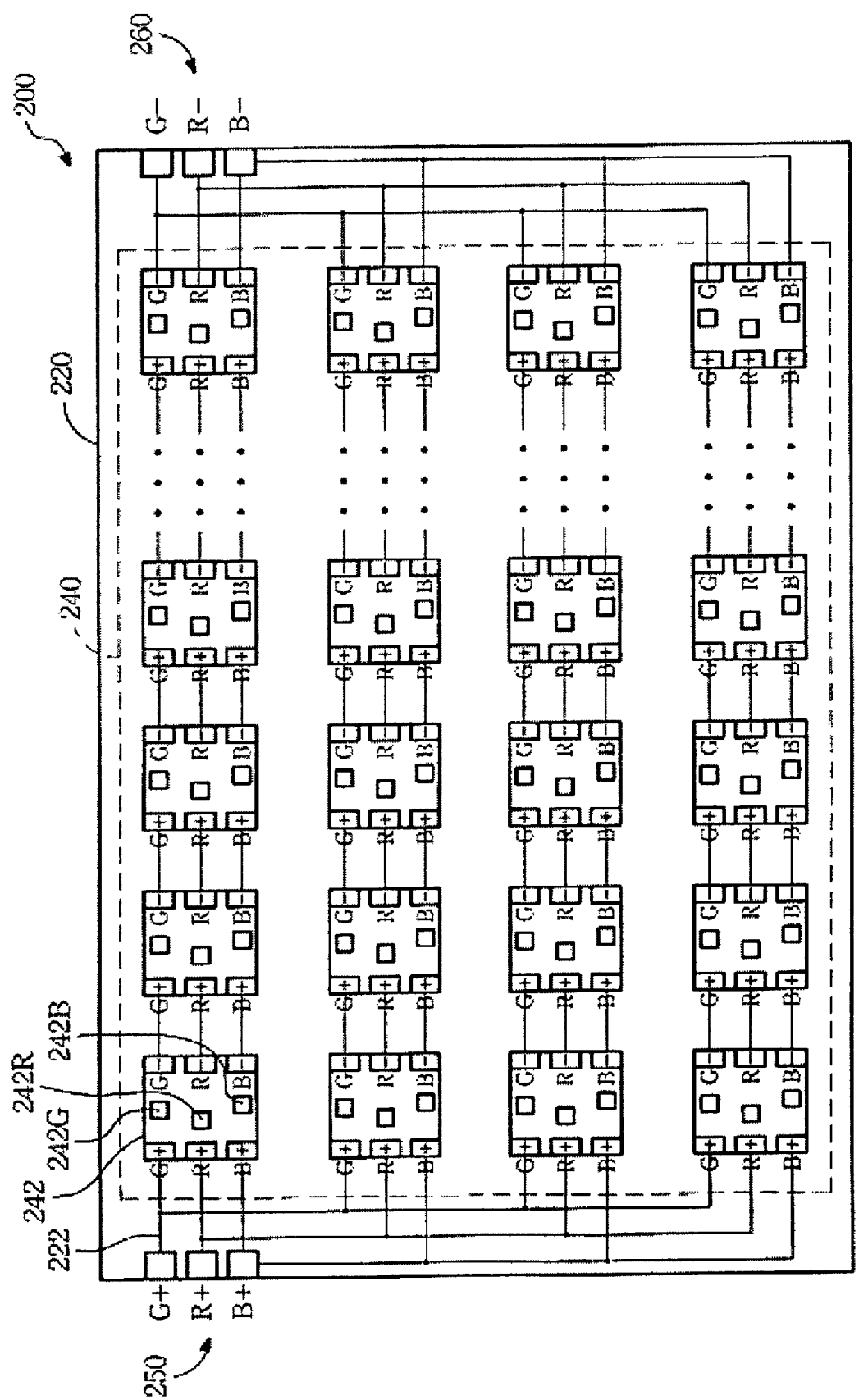
FIG. 3A is a schematic view showing another typical surface light source structure applied in the backlight module.
Figure 3B:
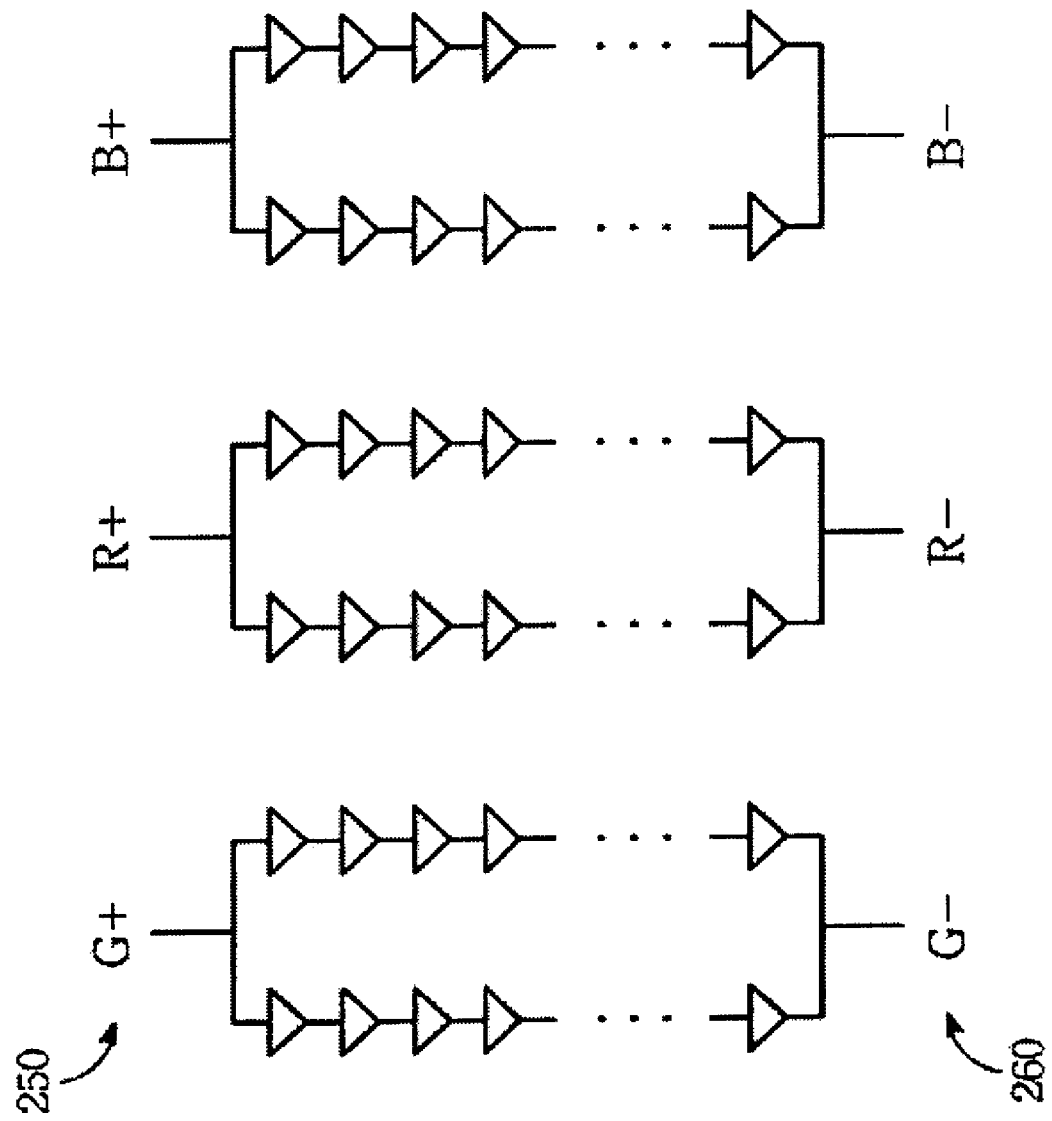
FIG. 3B is a circuit diagram showing an embodiment of the surface light source structure of FIG. 3A.
Figure 3C:
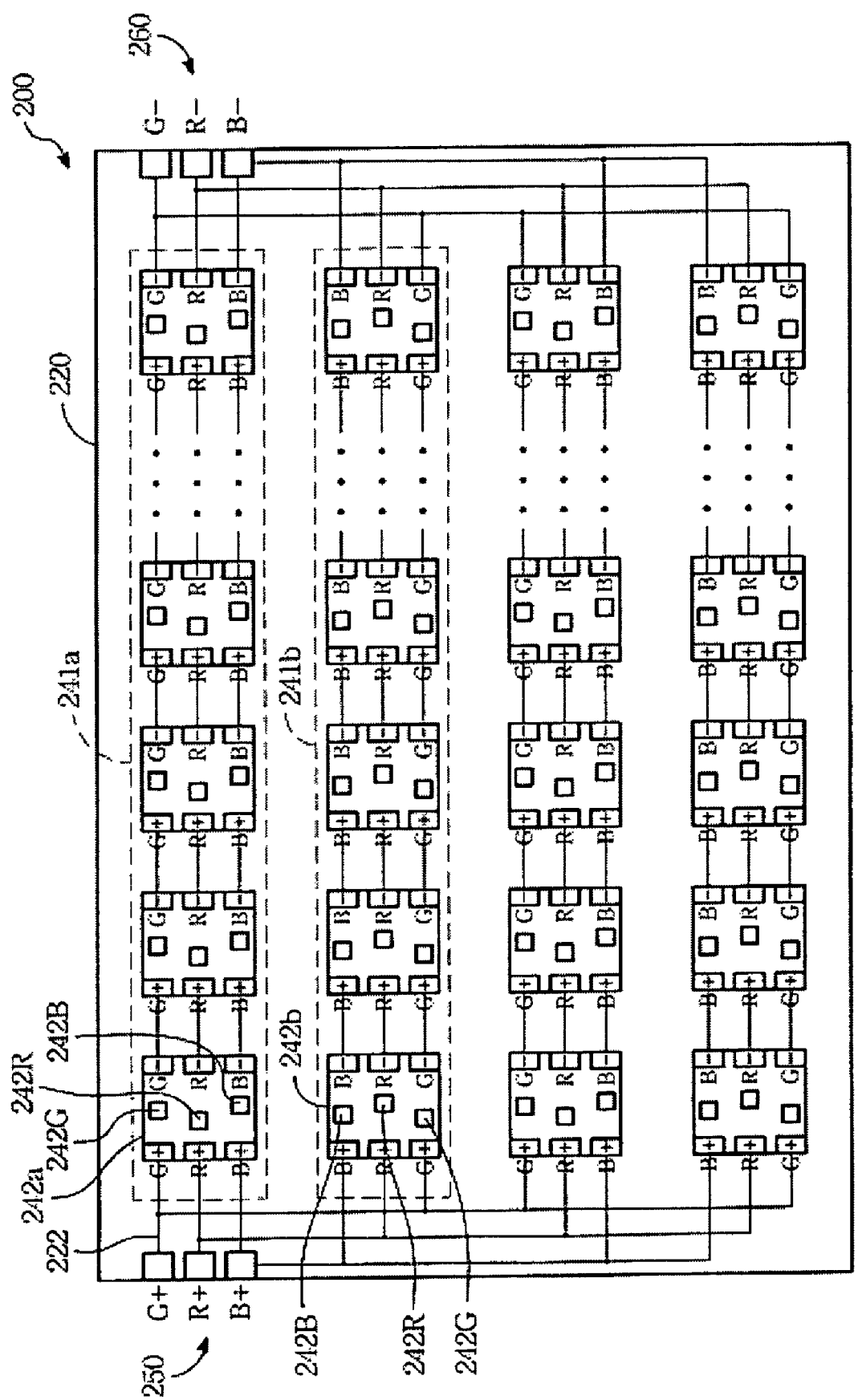
FIG. 3C is a circuit diagram showing another embodiment of the surface light source structure of FIG. 3A.

In addition, comparing with the surface light source structure 200 in FIG. 3A, since the positive-to-negative directions of the LED units 332 of the first LED array 330 and the LED units 342 of the second LED array 340 are arranged in opposite directions, white light generated by the first LED array 330 is compensated by white light generated by the second LED array 340 even if the LED units 332, 342 of the first LED array 330 and the second LED array 340 are with the same structure. Thus, in contrast with the surface light source structure 200 of FIG. 3A, the surface light source structure 300 in the embodiments of the present invention enhances light uniformity without the need of using two different LED packages.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A surface light source structure, applied in a backlight module, comprising:
    a circuit board;
    a first light emitting diode (LED) array, assembled on the circuit board and having a plurality of LED rows comprising at least a first row and a second row, each of the LED rows having a plurality of LED units, each LED unit comprises an LED package and includes at least one LED chip connected in series to define at least one serially connected series of same-color LED chips, and the LED rows of the first LED array being connected between a first positive electrode and a first negative electrode, wherein the first row and the second row of the first LED array are connected in parallel; and
    a second LED array, assembled on the circuit board and having a plurality of LED rows comprising at least a first row and a second row, each of the LED rows having a plurality of LED units, each LED unit comprises an LED package and includes at least one LED chip connected in series to define at least one serially connected series of same-color LED chips, and the LED rows of the second LED array being connected between a second positive electrode and a second negative electrode, wherein the first row and the second row of the first LED array are connected in parallel, wherein the LED rows of the second LED array are alternately disposed with the LED rows of the first LED array, and positive-to-negative directions of the LED units of the first LED array and positive-to-negative directions of the LED units of the second LED array being arranged in opposite directions;
    wherein each row of the first LED array is respectively separated from each row of the second LED array.

2. The surface light source structure of claim 1, wherein the LED unit of the first LED array is an LED package with at least a red, at least a blue, and at least a green LED chips.

3. The surface light source structure of claim 1, wherein the LED unit of the first LED array is an LED package with at least a blue LED chip and a packaging structure mixed with yellow-green fluorescent powders.

4. The surface light source structure of claim 1, wherein the LED unit of the first LED array is an LED package with at least a blue LED chip and a packaging structure mixed with red and greed fluorescent powders.

5. The surface light source structure of claim 1, wherein the LED units of the first LED array and those of the second LED array have the identical structure but are oppositely arranged on the circuit board.

6. The surface light source structure of claim 1, wherein the LED unit of the first LED array has at least a red LED package, at least a blue LED package, and at least a green LED package.

7. The surface light source structure of claim 1, wherein the LED rows of the first LED array and those of the second LED array are parallel to a short edge of the circuit board.

8. The surface light source structure of claim 1, further comprising a reflecting layer covering the circuit board for reflecting light provided by the LED units of the first LED array and that of the second LED array.

9. The surface light source structure of claim 1, wherein the circuit board has a through hole formed thereon, and a detecting unit is assembled in the through hole for detecting light generated by the surface light source structure.

10. The surface light source structure of claim 1, wherein the first positive electrode and the second negative electrode are located on an edge of the circuit board, and the first negative electrode and the second positive electrode are located on another edge of the circuit board.

11. The surface light source structure of claim 10, wherein the first positive electrode is electrically connected to positive terminals on a first unit of both the first LED row and the second LED row of the first LED array and the first negative electrode is electrically connected to negative terminals on a last unit of both the first LED row and the second LED row of the first LED array.

12. A backlight module, comprising:
    a surface light source structure, comprising:
    a circuit board;
    a first light emitting diode (LED) array, assembled on the circuit board and having a plurality of LED rows comprising at least a first row and a second row, each of the LED rows having a plurality of LED units, each LED unit comprises an LED package and includes at least one LED chip connected in series to define at least one serially connected series of same-color LED chips, and the LED rows of the first LED array being connected between a first positive electrode and a first negative electrode, wherein the first row and the second row of the first LED array are connected in parallel; and
    a second LED array, assembled on the circuit board and having a plurality of LED rows comprising at least a first row and a second row, each of the LED rows having a plurality of LED units, each LED unit comprises an LED package and includes at least one LED chip connected in series to define at least one serially connected series of same-color LED chips, and the LED rows of the second LED array being connected between a second positive electrode and a second negative electrode, wherein the first row and the second row of the first LED array are connected in parallel, wherein the LED rows of the second LED array are alternately disposed with the LED rows of the first LED array, and positive-to-negative directions of the LED units of the first LED array and positive-to-negative directions of the LED units of the second LED array being arranged in opposite directions;

wherein each row of the first LED array is respectively separated from each row of the second LED array; and at least an optical film, assembled on the circuit board, for uniforming light provided by the LED units of the first LED array and that of the second LED array.

13. The backlight module of claim 12, wherein the LED unit of the first LED array is an LED package with at least a red, at least a blue, and at least a green LED chips.

14. The backlight module of claim 12, wherein the LED units of the first LED array and those of the second LED array have the identical structure but are oppositely arranged on the circuit board.

15. The backlight module of claim 12, wherein the LED unit of the first LED array has at least a red LED package, at least a blue LED package, and at least a green LED package.

16. The backlight module of claim 12, wherein the LED rows of the first LED array and those of the second LED array are parallel to a short edge of the circuit board.

17. The backlight module of claim 12, further comprising a reflecting layer covering the circuit board for reflecting light provided by the LED units of the first LED array and that of the second LED array.

18. The backlight module of claim 12, further comprising a detecting unit, wherein the circuit board has a through hole formed thereon, and the detecting unit is assembled in the through hole for detecting light generated by the surface light source structure.

19. The backlight module of claim 12, wherein the first positive electrode and the second negative electrode are located on an edge of the circuit board, and the first negative electrode and the second positive electrode are located on another edge of the circuit board.

20. The backlight module of claim 19, wherein the first positive electrode is electrically connected to positive terminals on a first unit of both the first LED row and the second LED row of the first LED array, and the first negative electrode is electrically connected to negative terminals on a last unit of both the first LED row and the second LED row of the first LED array.

* * * * *